United States Patent
Son

(10) Patent No.: US 6,292,913 B1
(45) Date of Patent: Sep. 18, 2001

(54) METHOD OF DETECTING DEFECTS IN A MAGNETIC DISK MEMORY DEVICE

(75) Inventor: Byung-Kug Son, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/222,705

(22) Filed: Dec. 29, 1998

(30) Foreign Application Priority Data

Dec. 29, 1997 (KR) .................................................. 97-75925

(51) Int. Cl.[7] .................................................. G11C 29/00
(52) U.S. Cl. .................................................. 714/718
(58) Field of Search .................................................. 714/719, 718, 714/723; 360/53, 40, 25, 46

(56) References Cited

U.S. PATENT DOCUMENTS

| | | |
|---|---|---|
| 4,214,280 | 7/1980 | Halfhill et al. . |
| 4,924,331 | 5/1990 | Robinson et al. . |
| 5,047,874 | 9/1991 | Yomtoubian . |
| 5,333,140 * | 7/1994 | Moraru et al. ........................ 714/719 |
| 5,424,638 * | 6/1995 | Huber .................................... 324/212 |
| 5,532,586 | 7/1996 | Ishikawa ............................... 324/212 |
| 5,720,030 * | 2/1998 | Kamihara et al. ...................... 714/42 |
| 5,737,519 | 4/1998 | Abelnour et al. . |
| 5,754,353 * | 5/1998 | Behrens et al. ......................... 360/53 |
| 5,784,216 | 7/1998 | Zaharris . |
| 5,786,951 * | 7/1998 | Welland et al. ......................... 360/46 |
| 5,987,634 * | 11/1999 | Behrens et al. ....................... 714/719 |
| 6,098,185 * | 8/2000 | Wilson ................................. 714/710 |

FOREIGN PATENT DOCUMENTS

| | | |
|---|---|---|
| 2326755 | 12/1998 | (GB) . |
| WO 9605596A1 | 2/1996 | (WO) . |

\* cited by examiner

*Primary Examiner*—Albert DeCady
*Assistant Examiner*—Joseph D. Torres
(74) *Attorney, Agent, or Firm*—Robert E. Bushnell, Esq.

(57) ABSTRACT

There is provided a method of detecting defects in a magnetic disk memory device. In the defect detecting method, a scrambling function is disabled, and a defect is detected by performing a write/read test on a test data pattern. The test data pattern is written/read in a high-frequency pattern.

10 Claims, 3 Drawing Sheets

METHOD OF DETECTING DEFECTS IN A MAGNETIC DISK MEMORY DEVICE

CLAIM OF PRIORITY

This application makes reference to, incorporates the same herein, and claims all benefits accruing under 35 U.S.C. §119 from an application entitled *Method Of Detecting Defects In Magnetic Disk Memory Device* earlier filed in the Korean Industrial Property Office on Dec. 29 1998, and there duly assigned Ser. No. 97-75925 by that Office.

BACKGROUND OF THE INVENTION

1. Field of the Invention

The present invention relates to a process of fabricating a magnetic disk memory device, and in particular, to a method of detecting defects in the surfaces of a magnetic disk in a sequence of fabrication processes and rendering a defective disk surface unavailable in a user environment.

2. Description of the Related Art

A hard disk drive widely used as an auxiliary memory device for a computer system is a major magnetic disk memory device. In the hard disk drive, data is recorded in tracks concentrically arranged on a magnetic disk. A head or a data transducer accesses these tracks to read data from, write data to erase data from, the disk.

In general, it is impossible to fabricate a perfect defect-free disk in view of its fabrication process, and even possible fabrication of perfect defect-free disks leads to a low product yield and a high production cost. Thus, a disk manufacturer and a hard disk drive manufacturer allow disks to be defective to a certain extent. New defects may be produced in a disk during a fabrication process or in a field after it is completely fabricated because it is fabricated of a material vulnerable to shocks.

Meanwhile, the trend of hard disk drives goes toward increasing the recording density of a disk to increase the storage capacity of the disk. Along with this, various parts such as a head have been developed toward high precision. As a result, micro defects, which caused negligibly small and correctable errors before, now generate data errors in so many bits that they cannot be corrected.

A so-called burn-in process is performed to detect such defects beforehand and to determine a corresponding disk to be defective or not according to the number of defects. The burn-in test is implemented on a rack in a burn-in room without an additional test system by a firmware, consuming generally 8–16 hours, longer than any other step in the hard disk drive fabrication process, so that defects are detected from a disk surface beforehand to avoid a defective portion when the drive is used and thus contribute to consumer's reliable use of the hard disk drive.

A defect sector detecting test is performed during the burn-in step in the hard disk drive fabricating process, wherein a microprocessor for controlling the whole operations of a hard disk drive performs a write/read test on the entire areas of a disk surface, applying a stress on a read/write channel by causing a magnetic head to move off track or changing a read/write channel parameter, in order to find a defect sector from the disk surface. In the case of an off track stress, a head does not follow the center of the track, and a read/write operation is abnormally executed. In the case of the above abnormal read/write operation, because an error due to a micro defect is amplified, the defects of a disk can be easily detected. During the write/read test, a sector having a write/read error (i.e., a defect) is detected. The address of the defect sector is written in a defect list of a predetermined area, that is, a maintenance area on the disk surface and is not accessed later in a user environment, to thereby provide a defect-free hard disk drive to a user.

However, in the above conventional test for detecting a defective sector, there is difficulty in accurately detecting a defect in a disk with respect to pattern variations and in determining that a signal having no margin is defective because a write/read test pattern designated in a burn-in script file is written/read while a scrambling function is enabled. The scrambling function refers to avoiding writing symbols of the same codeword in an identical group and writing data randomly according to patterns given from different codewords.

In the case of a micro defect, for example, when data is written in a defective portion in a high-frequency pattern or a low-frequency pattern, magnetic components are not accurately recorded due to the defect. Thus, when reading the data, the amplitude of a data bit is smaller than that of a bit normally written or the data bit is damaged, leading to a read error. On the other hand, when the data is written in the defective portion in the low-frequency pattern, the data bit may not be damaged if the defective portion is small. In this case, no error is generated during a write/read operation, thereby impeding an accurate test.

Techniques for preventing the use of bad disks or bad sectors of a disk are discussed in the following patents incorporated by reference: U.S. Pat. No. 5,784,216 to Dan Zaharris entitled *Method And Apparatus For Recording Defective Track Identification Information In A Disk Drive*; U.S. Pat. No. 5,737,519 to Ghassan Maurice Abelnour et al. entitled *System And Method For Early Disk Drive Fault Detection*; U.S. Pat. No. 5,047,874 to Ruben Yomtoubian entitled *Technique For Certifying Disk Recording Surface*; U.S. Pat. No. 4,924,331 to Don M. Robinson et al. entitled *Method For Mapping Around Defective Sectors In A Disc Drive*; and U.S. Pat. No. 4,214,280 to Martin O. Halfhill et al. entitled *Method And Apparatus For Recording Data Without Recording On Defective Areas Of A Data Recording Medium*.

SUMMARY OF THE INVENTION

An object of the present invention is to provide a method of more easily detecting defects.

Another object of the present invention is to provide a method of detecting micro defects in a magnetic disk memory device fabricating process to prevent an error from occurring due to the micro defects in a user environment.

To achieve the above objects, there is provided a method of detecting defects in a magnetic disk memory device. In the defect detecting method, a scrambling function is disabled, and a defect is detected by performing a write/read test on a test data pattern. The test data pattern is written/read in a high-frequency pattern.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

An embodiment of the present invention will be described in detail with reference to the attached drawings.

Figure 1:
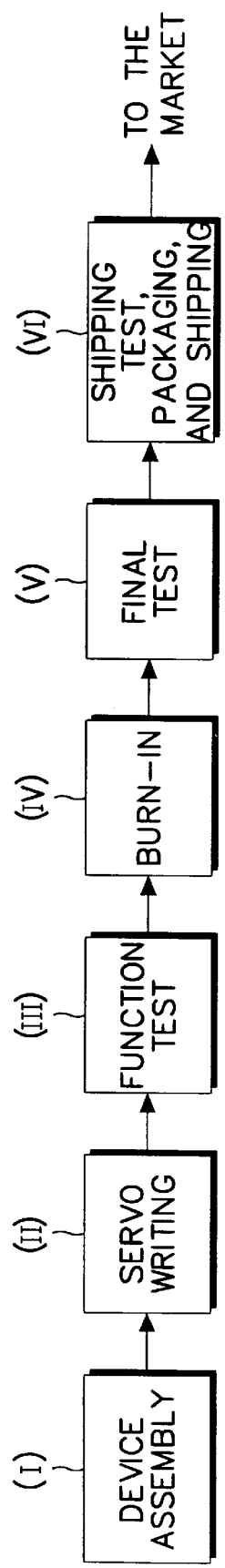
FIG. 1 is a flowchart of a sequence of steps in a hard disk drive fabricating process.

FIG. 1 is a flowchart of a hard disk drive fabricating process performed largely in six steps.

Referring to FIG. 1, a head disk assembly (HDA) being a mechanical part of a hard disk drive is assembled in step (I), a servo write pattern is written on a disk surface by a servo writer, for servo control of an actuator, in step (II), and the HDA is assembled with a printed circuit board assembly (PCBA) produced in a PCBA assembly step usually subsequent to the HDA assembly step and a function test is performed on the HDA and PCBA to determine whether they are well matched in operation, in step (III). Step (III) is the first test applied to the combined HDA and PCBA. In step (IV), a burn-in test is implemented on a rack in a burn-in room without an additional test system by a firmware, consuming generally 8–16 hours, step IV is larger than any other step in the hard disk drive fabrication process, thus, defects are detected from a disk surface beforehand in order to avoid a portion when the drive is used and thus contribute to consumer's reliable use of the hard disk drive. In step (V), a final test is performed to determine whether a hard disk drive set passed through the burn-in step is normally defect-processed. The hard disk drive set passed through the final test in step (V) is subjected to a shipping test, packaged, and shipped in step (VI). Finally, the hard disk drive set comes out to the market as a completed product.

Figure 2:
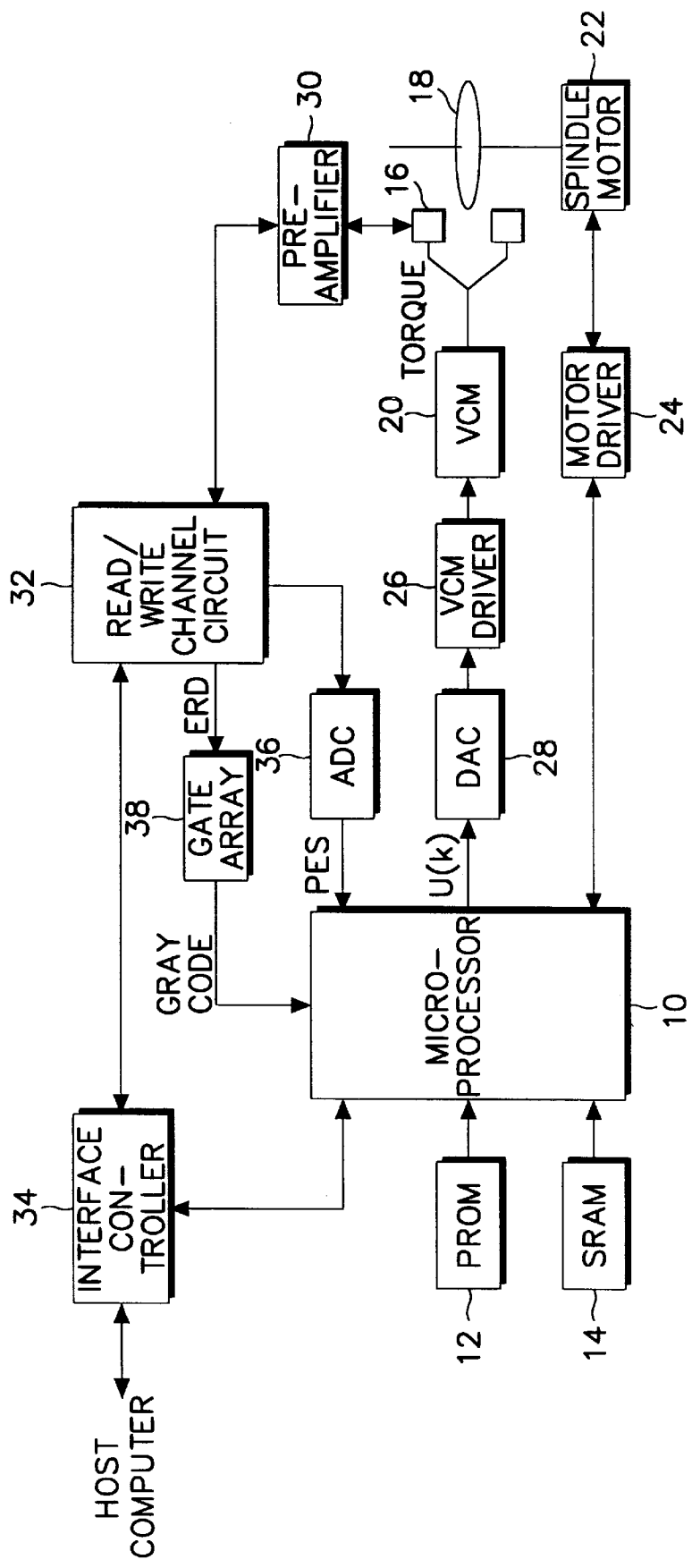
FIG. 2 is a block diagram of a hard disk drive to which the present invention is applied.

FIG. 2 is a block diagram of a hard disk drive to which the present invention is applied. Referring to FIG. 2, a microprocessor 10 is connected to a PROM (Programmable Read Only Memory) 12 for storing a specific control program and data of the microprocessor 10, and an SRAM (Static Random Access Memory) 14, and controls the whole operations of the hard disk drive. A head 16, fixed at an end of an actuator, horizontally flies over a disk 18 being a recording medium, for writing or reading data on or from the disk 18. A VCM (Voice Coil Motor) 20, positioned at the other end of the actuator, drives the head 16 to horizontally move over the disk 18 according to the level and direction of a current applied to the VCM 20. A spindle motor 22 rotates the disk 18 stacked around a driving shaft according to a control signal received from a motor driver 24. A VCM driver 26 is connected to the VCM 20 and controls driving of the VCM 20. A DAC (Digital-to-Analog Converter) 28 connected to the microprocessor 10 and the VCM driver 26 receives a digital control input signal U(k) from the microprocessor 10, converts the received signal to an analog signal, and outputs the analog signal to the VCM driver 26.

The motor driver 24 is connected to the spindle motor 22 and the microprocessor 10, for controlling the driving of the spindle motor 22 under the control of the microprocessor 10. A preamplifier 30 is connected to the head 16, preamplifies a reproduced signal, outputs the preamplified signal, and outputs an input write signal to the head 16. A read/write channel circuit 32 is connected to the microprocessor 10, the preamplifier 30, and an interface controller 34, receives write data from the interface controller 34, encodes the write data, and outputs the encoded write data to the preamplifier 30 under the control of the microprocessor 10. The read/write channel circuit 32 converts an analog reproduction signal received from the preamplifier 30 to a digital signal, and outputs the digital signal as encoded read data ERD. An ADC (Analog-to-Digital Converter) 36 is connected to the read/write channel circuit 32, receives an analog servo reproduction signal from the read/write channel circuit 32, converts the received signal to a digital position error signal PES, and outputs the signal PES to the microprocessor 10. A gate array 38 is connected to the read/write channel circuit 32, receives the signal ERD, detects servo information such as a gray code in a servo area of the disk 18, and outputs the detected servo information. The interface controller 34 interfaces transmission and reception of various data between an external data input device (e.g., a host computer) and the microprocessor 10 and between the external data input device and the read/write channel circuit 32.

A firmware is stored usually in the PROM 12 to drive a circuit portion and a mechanical portion in the hard disk drive. A defect test program characteristic of the present invention is also added to the firmware.

Figure 3:
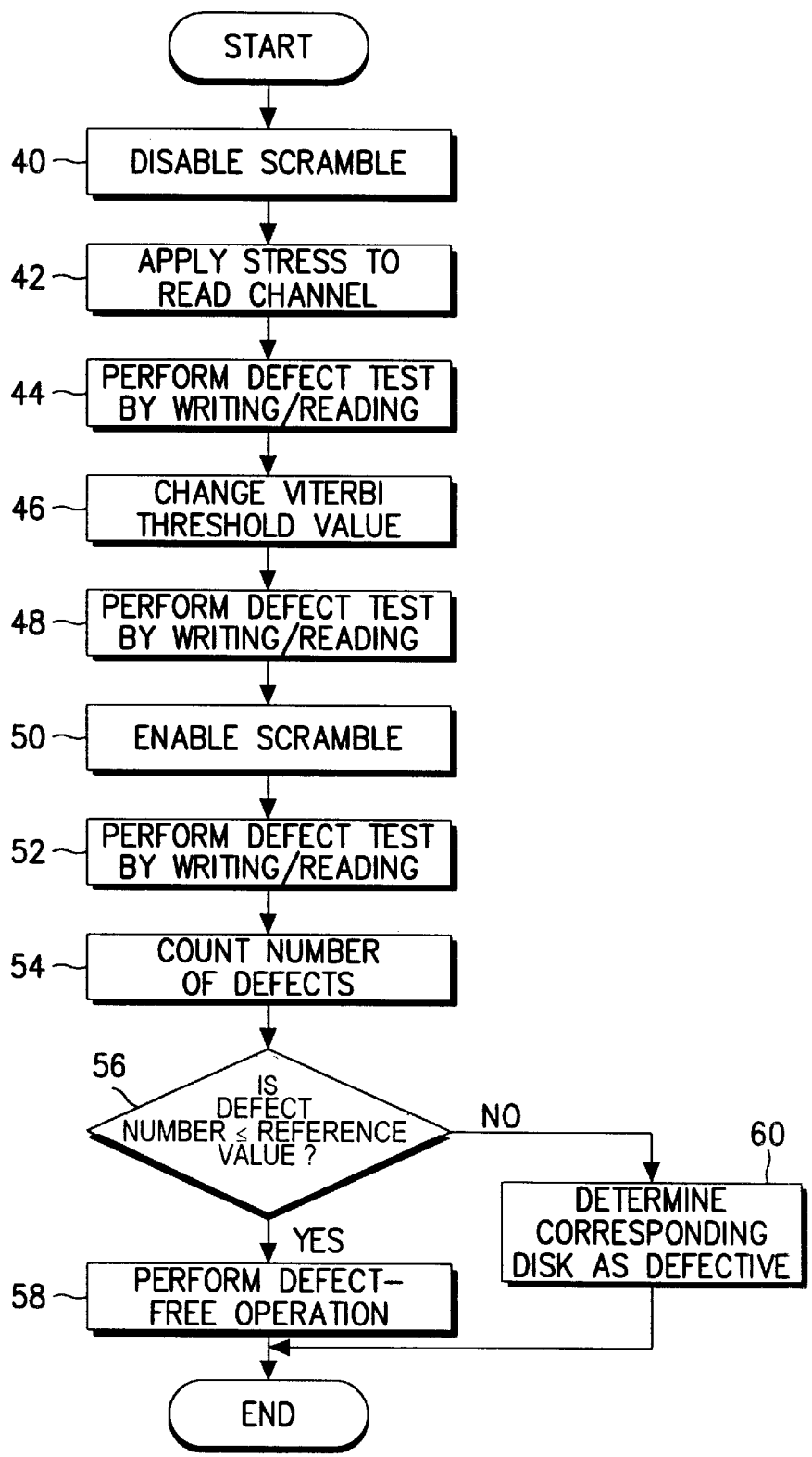
FIG. 3 is a flowchart of a defect detecting process performed by a microprocessor according to an embodiment of the present invention.

Now, a defect detecting process according to an embodiment of the present invention will be described. FIG. 3 is a flowchart of the defect detecting process performed by the microprocessor 10. Referring to FIG. 3, the microprocessor 10 disables a scrambling function before the defect detecting process starts, in step 40. The defect detecting process is similar to a conventional one, but enables more accurate detection of defects because it is performed with the scrambling function disabled. The microprocessor 10 applies a stress to a read channel, in step 42. A defect test is performed by a write/read operation utilizing a test data pattern, in step 44. Here, the test data pattern is written/read in a high-frequency pattern according to the feature of the present invention in order to detect even a micro defect. The address of a portion having a write/read error detected during this write/read test, that is, the address of a defect sector is recorded in a predetermined area, say, a maintenance area of the disk 18. The microprocessor 10 changes a Viterbi threshold value in step 46, and detects a defect by a write/read test in step 48. The Viterbi threshold is a standard value that enables the level ('LOW' or 'HIGH') of a reproduced signal to be determined. Data is more normally reproduced when the Viterbi threshold is a low Viterbi threshold value than when the Viterbi threshold is a high Viterbi threshold value. Thus, when testing the defects of a disk, the Viterbi threshold value is increased in order to easily detect the defects. The address of a defect sector is recorded in the predetermined area of the disk 18. The microprocessor 10 enables the scrambling function in step 50, and detects a defect by a write/read test in step 52. In step 54, the number of defects detected so far is counted. In step 56, the microprocessor 10 determines whether the number of defects is a reference value or smaller, that is, whether the number of the defects is within the range allowed to determine the disk 18 to be good. If the number of the defects exceeds the reference value, the disk 18 is determined to be defective in step 60. On the contrary, if the number of the defects is the reference value or smaller, a defect-free operation is performed in step 58. In the defect-free operation, the addresses of the defect sectors are recorded in the defect list of the predetermined area in the disk 18, so that they are not accessed later in a user environment and thus a defect-free hard disk drive is provided to a user.

As described above, defects are defected with a scrambling function disabled and a write/read test is performed in a high-frequency pattern in the process of detecting a defect sector from a disk surface according to the present invention. Therefore, defects are more easily detected, and even micro defects are detected, thus preventing micro defect-induced errors in a user environment.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of detecting defects in a magnetic disk memory device having a scrambling function which avoids writing symbols of a same codeword in an identical group and writes data randomly according to patterns given from different codewords, the method comprising steps of:

disabling the scrambling function that avoids writing symbols of a same codeword in an identical group and the writing of data randomly according to patterns given from different codewords; and detecting a defective sector by performing a write/read test, utilizing a test data pattern, on a disk of said magnetic disk memory device.

2. The method as set forth in claim 1, wherein the test data pattern is written/read in a high-frequency pattern.

3. The method as set forth in claim 1, further comprising steps of:

recording in a predetermined area of said disk an address of a detected during this write/read test.

4. The method as set forth in claim 3, wherein said predetermined area is a maintenance area of said disk.

5. The method as set forth in claim 3, further comprising steps of:

changing a Viterbi threshold value; and detecting a defective sector by a second write/read test performed on said disk; and recording an address of a defective sector detected during said second write/read test, in said predetermined area of said disk.

6. The method as set forth in claim 5, further comprising steps of:

enabling said scrambling function;

detecting a defective sector by a third write/read test performed on said disk;

counting each defective sector detected in said first, second and third write/read tests;

determines whether a resulting number of said counting step is equal to or smaller than a reference value;

identifying said disk as being defective when it is determined that said number exceeds said reference value; and recording the addresses of the defective sectors in a defective sector list of said predetermined area to prevent said defective sectors from being accessed later in a user environment.

7. A method of detecting defects in a magnetic disk memory device having a scrambling function which avoids writing symbols of a same codeword in an identical group and writes data randomly according to patterns given from different codewords, the method comprising steps of:

disabling the scrambling function that avoids writing symbols of a same codeword in an identical group and the writing of data randomly according to patterns given from different codewords; and detecting a defective sector by performing a write/read test, utilizing a test data pattern, on a disk of said magnetic disk memory device;

recording in a predetermined area of said disk an address of a defective sector detected during this write/read test;

enabling said scrambling function;

detecting a defective sector by another write/read test performed on said disk;

counting each defective sector detected in each of said write/read tests;

determines whether a number resulting from said counting step is equal to or smaller than a reference value;

identifying said disk as being defective when it is determined that said number exceeds said reference value; and recording the addresses of the defective sectors in a defect list of said predetermined area to prevent said defective sectors from being accessed later in a user environment.

8. The method as set forth in claim 7, wherein the test data pattern is written/read in a high-frequency pattern.

9. The method as set forth in claim 7, wherein said predetermined area is a maintenance area of said disk.

10. A method of detecting defects in a magnetic disk memory device having a scrambling function which avoids writing symbols of a same codeword in an identical group and writes data randomly according to patterns given from different codewords, the method comprising steps of:

disabling said scrambling function; and detecting a defective sector by performing a write/read test, utilizing a test data pattern, on a disk of said magnetic disk memory device;

recording in a predetermined area of said disk an address of a defective sector detected during this write/read test;

changing a Viterbi threshold value;

detecting a defective sector by a second write/read test performed on said disk;

recording an address of a defective sector detected during said second write/read test, in said predetermined area of said disk;

enabling said scrambling function;

detecting a defective sector by another write/read test performed on said disk;

counting each defective sector detected in each of said write/read tests;

determines whether a number resulting from said counting step is equal to or smaller than a reference value;

identifying said disk as being defective when it is determined that said number exceeds said reference value; and recording the addresses of the defective sectors in a defect list of said predetermined area to prevent said defective sectors from being accessed later in a user environment.

* * * * *